United States Patent
Schinkel et al.

(10) Patent No.: US 12,237,993 B2
(45) Date of Patent: Feb. 25, 2025

(54) METHOD OF OPTIMIZING A ROUTING IN A COMMUNICATIONS NETWORK

(71) Applicants: Fujitsu Technology Solutions GmbH, Munich (DE); Deutsche Telekom AG, Bonn (DE)

(72) Inventors: Fritz Schinkel, Munich (DE); Christian Münch, Munich (DE); Sebastian Engel, Munich (DE); Marc Geitz, Hagen (DE); Oliver Holschke, Berlin (DE); Timmy Schüller, Münster (DE)

(73) Assignees: Fujitsu Technology Solutions GmbH, Munich (DE); Deutsche Telekom AG, Bonn (DE)

( * ) Notice: Subject to any disclaimer, the term of this patent is extended or adjusted under 35 U.S.C. 154(b) by 0 days.

(21) Appl. No.: 18/288,635

(22) PCT Filed: Sep. 15, 2022

(86) PCT No.: PCT/EP2022/075644
§ 371 (c)(1),
(2) Date: Oct. 27, 2023

(87) PCT Pub. No.: WO2023/041643
PCT Pub. Date: Mar. 23, 2023

(65) Prior Publication Data
US 2024/0214302 A1    Jun. 27, 2024

(30) Foreign Application Priority Data
Sep. 20, 2021 (DE) .......................... 102021004920.9
Oct. 27, 2021 (EP) ..................................... 21204993

(51) Int. Cl.
*H04L 45/125* (2022.01)
*H04L 45/12* (2022.01)
(Continued)

(52) U.S. Cl.
CPC .......... *H04L 45/125* (2013.01); *H04L 45/123* (2013.01); *H04L 45/124* (2013.01); *H04L 47/125* (2013.01); *H04W 40/02* (2013.01)

(58) Field of Classification Search
None
See application file for complete search history.

(56) References Cited

U.S. PATENT DOCUMENTS

2009/0059793 A1\* 3/2009 Greenberg ............ H04L 45/125
                                                      370/235
2015/0319047 A1\* 11/2015 Patel ....................... H04L 41/12
                                                      398/79
(Continued)

FOREIGN PATENT DOCUMENTS

CN       110891019 A     3/2020
WO    2021/157008 A1    8/2021

OTHER PUBLICATIONS

International Search Report dated Dec. 13, 2022, of counterpart International Application No. PCT/EP2022/075644.
(Continued)

*Primary Examiner* — Benjamin Lamont
(74) *Attorney, Agent, or Firm* — DLA Piper LLP (US)

(57) ABSTRACT

A computer-implemented method optimizes a routing of data traffic in a communications network by using a quantum concept processor. A set of potential short communication paths among possible communication paths between respective origin nodes and respective destination nodes of captured traffic demands is specified. The edges within the set of potential short communication paths are assigned a respective usage capacity limit. Fractional capacity usages of the edges are calculated based on respective usage capacity limits of the edges. The calculated fractional capacity usages are formulated as terms of a quadratic stress function. An optimized routing is determined by using a quantum (Continued)

concept processor, thereby selecting for each traffic demand one short communication path from the set of potential short communication paths such that the quadratic stress function is minimized.

18 Claims, 5 Drawing Sheets

(51) Int. Cl.
    *H04L 47/125* (2022.01)
    *H04W 40/02* (2009.01)

(56) References Cited

U.S. PATENT DOCUMENTS

| | | | |
|---|---|---|---|
| 2016/0164781 A1* | 6/2016 | Imai | H04L 47/72 370/252 |
| 2017/0286852 A1 | 10/2017 | Rezaie et al. | |
| 2020/0396154 A1 | 12/2020 | Fiaschi et al. | |
| 2021/0390159 A1* | 12/2021 | De Carvalho, Jr. | G06Q 10/047 |
| 2023/0049956 A1 | 2/2023 | Miyahara et al. | |

OTHER PUBLICATIONS

Su, J. et al., "Fast Embedding of Constrained Satisfaction Problem to Quantum Annealer with Minimizing Chain Length", *DAC '17: Proceedings of the 54th Annual Design Automation Conference*, Jun. 18, 2017, vol. 77, pp. 1-6.

Extended European Search Report from corresponding EP Patent Application No. 21204993.6 dated Apr. 8, 2022.

Notice of Reason(s) for Rejection dated Nov. 19, 2024, of counterpart Japanese Patent Application No. 2023-570455.

* cited by examiner

FIG 1

FIG 4A $$H_{2SRpath} := \sum_{(o,d)\in D}\left(\sum_{s\in S} x_{o,d}^s - 1\right)\cdot\left(\sum_{s\in S} x_{o,d}^s\right) = 0$$

FIG 4B $$\text{Min } H_{TLE} := \sum_{(o,d)\in D}\sum_{s\in S} x_{o,d}^s$$

FIG 4C $$\text{Min } H_{min} := \sum_{e\in E}\left(\sum_{(o,d)\in D}\sum_{s\in S}\left[\sum_{p\in paths(o,s):e\in p}\left(\frac{d_{o,d}}{c_e|paths(o,s)|}\right)^q + \sum_{p\in paths(s,d):e\in p}\left(\frac{d_{o,d}}{c_e|paths(s,d)|}\right)^q\right]\cdot x_{o,d}^s + \sum_{(o,d)\in D}\sum_{p\in paths(o,d):e\in p}\left(\frac{d_{o,d}}{c_e|paths(o,d)|}\right)^q (1 - \sum_{s\in S} x_{o,d}^s)\right)$$

FIG 4D

QUBO: $A\cdot H_{2SRpath} + B\cdot H_{min} + C\cdot H_{TLE}$, with $A > B, C > 0$

FIG 5

METHOD OF OPTIMIZING A ROUTING IN A COMMUNICATIONS NETWORK

TECHNICAL FIELD

This disclosure pertains to a computer-implemented method of optimizing a routing of data traffic in a communications network with a plurality of communication nodes connectable over edges (links) of communication paths for a routing of the data traffic as well as a quantum concept processor configured to perform such a method and a computer program implemented to perform such a method.

BACKGROUND

Today's demands regarding data traffic in communications networks are dramatically increasing. With the recent introduction of 5G, more and more devices and applications push data traffic to new peaks. Moreover, the increasing demand of digitized and decentralized working as well as increasing streaming demands in the domestic environment of private households are other big contributors to this trend. These increasing amounts of data being transported through communications networks like the internet impose a significant challenge to Service Providers. To avoid congestion of communications networks and degradation of user experience, traffic engineering techniques are deployed to complement the comparatively slow and expensive expansion of network infrastructure.

The most widely deployed engineering techniques for data traffic management in communications networks operate on the premise of shortest paths computed with respect to link weights. These weights are often related to link capacities, i.e., the maximum amount of data per unit time that can be routed over a link from a starting node to an end node connected by that link respectively edge. The final routing from an origin node to a destination node of the data streams, under the consideration of interim nodes and given links or edges, is based on the identified paths of the shortest paths found. As a result, the most straight-forward and practically oriented technique to guide traffic demands is by manipulation of these link weights that can also be called link metrics or Interior Gateway Protocols (IGP) metrics. The higher the link weight of an edge, the higher the probability of data being routed over the respective edge. Following that approach, in a reactive manner, link weights are adapted locally whenever a certain link tends to be overloaded. In a more systematic manner, the problem has been further dealt with by applying linear integer computer programs, where the optimization targets are the minimization of the maximal link capacity usage in the network. The task of finding a globally optimal set of metrics, however, is very complex. In terms of computational complexity this task is NP-hard. This is because each link metric potentially impacts a large number of communication paths.

The linear optimization techniques applied so far quickly reach their limits when actual non-linear conditions are taken into account, like redundancies, geographical subgroups or subdomains (e.g. European network and US network considered in one model), inclusion of satellites, Quality of Service, QoS, relationships and the like. Moreover, the known techniques often lead to the problem of unused capacity usage and overloads of link capacities in communication paths within a network, where many links are close to their capacity limit.

It could therefore be helpful to provide enhanced techniques that allow for an optimized utilization of communication paths within a communications network with respect to capacity limits, thereby achieving an optimized routing.

SUMMARY

We provide a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized.

We also provide a quantum concept processor, configured to perform one or more steps of a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized.

We further provide a computer program, the computer program including instructions that, when the program is executed by one or more processors, cause each of the one or more processors to perform one or more steps of a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized.

We still further provide a computer-readable storage medium for a computer program, the computer program including instructions that, when the program is executed by one or more processors, cause each of the one or more processors to perform one or more steps of the method of a quantum concept processor, configured to perform one or more steps of a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized is stored.

We yet further provide a workplace for a network planner, configured to verify an optimized routing determined by the method of a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized.

We still yet further provide an interface arrangement including one or more interfaces to a plurality of communication nodes of a communications network in which data traffic is routed, wherein the interface arrangement is configured to automatically deploy an optimized routing determined by the method of a computer-implemented method of optimizing a routing of data traffic in a communications network with a plurality of communication nodes connectable over edges of communication paths for a routing of the data traffic, wherein the method includes capturing a set of traffic demands, each traffic demand specifying a transfer of a determined data volume from an origin node to a destination node among the plurality of communication nodes, specifying a set of potential short communication paths among possible communication paths between the respective origin nodes and the respective destination nodes specified in the set of traffic demands, wherein edges within the set of potential short communication paths are assigned a respective usage capacity limit, calculating, for the set of traffic demands, fractional capacity usages of the edges within the set of potential short communication paths, the fractional capacity usages being calculated based on the respective usage capacity limit, formulating the calculated fractional capacity usages as terms of a quadratic stress function, and determining, by using a quantum concept processor, an optimized routing by selecting for each traffic demand of the set of traffic demands one short communication path from the set of potential short communication paths such that the quadratic stress function is minimized to the communication nodes of the communications network.

LIST OF REFERENCE SIGNS 1 communications network
2, 2a-2f communication nodes
3, 3a-3e aggregation nodes
4 connections between adjacent nodes
5 set of traffic demands
5a, 5b traffic demands
6 quantum concept processor
7 subset of traffic demands
8 subset of segment nodes
d, d1, d2 destination node e, e1, e2 edges
o, o1, o2 origin node
p, p1-p4 potential communication path
S set of segment nodes
s1, s2 segment nodes
t1, t2, t21 terms of a quadratic stress function

DETAILED DESCRIPTION

Our method is a computer-implemented procedure that optimizes a routing of data traffic in a communications network with a plurality of communication nodes. The communication nodes are connected by edges of the communications network. A series of edges yields a communication path for a routing of the data traffic. Hence, an edge of a communication path in this context describes a connection between two adjacent nodes within a communication path.

The method comprises the following steps:
capturing a set of traffic demands, each traffic demand specifying a transfer of a determined data volume from an origin node to a destination node among the plurality of communication nodes,
specifying a set of potential short communication paths among possible communication paths between the respective origin nodes and the respective destination nodes specified in the set of traffic demands, wherein the edges within the set of potential short communication paths are assigned a respective usage capacity limit,
calculating for the set of traffic demands, fractional capacity usages of the edges within the set of potential short communication paths, the fractional capacity usages being calculated based on the respective usage capacity limit,
formulating the calculated fractional capacity usages in terms of a quadratic stress function, and
determining by using a quantum concept processor, an optimized routing by selecting for each traffic demand of the set of traffic demands one short communication path from the set of potential short communication paths such that the quadratic stress function is minimized.

This method reliably tackles the problem of routing network demands in a communications network along optimized short paths, thereby avoiding in an optimized manner that link capacities in the network are exceeded.

By applying the method, for every given traffic demand, one optimal option for a short communication path from the set of potential short communication paths can be selected. The selection is chosen such that the capacity of all edges (links) in used communication paths within the network is respected as upper limit for the total volume of traffic demands routed along them.

"Traffic demands" are modelled as 3-tuples, defining an origin node (source of a data stream), an end node or destination node (destination of a data stream), and the determined data traffic to be transferred between origin and destination. The focus is on providing continuous data streams over the network, to be modelled and routed such that no data is lost during transmission by exceeding specified capacities on given transport links. Measurement for data transfer rates of such data stream requests or demands are currently specified in Gbps (Gigabit per second).

The "short" communication paths can be selected either as paths with determined intermediate nodes between the respective origin nodes and the respective destination nodes specified in the set of traffic demands, or as direct, shortest paths. According to a detailed example explained below, "short" communication paths with determined intermediate nodes (so called segment nodes) between the respective origin nodes and the respective destination nodes are specified in the set of traffic demands, which each consists of a shortest path from an origin to the segment node and a shortest path from the segment node to a destination node.

By selecting such short paths between respective origin nodes and respective destination nodes, a more or less direct routing can be achieved, thereby avoiding elongated communication paths that disadvantageously burden a plurality of edges along a respective communication path with significant capacity usage in an inefficient manner.

The set of potential short communication paths among possible communication paths between the respective origin nodes and the respective destination nodes is pre-determined by applying, for example, a Dijkstra algorithm or any other algorithm among the class of efficient shortest path algorithms.

By calculating fractional capacity usages of the edges within the set of potential short communication paths and formulating the calculated fractional capacity usages as terms of a quadratic stress function, a quadratic optimization problem can be formulated to deal with the complexity of the above-explained optimization problem. The application of such quadratic optimization problem has the effect that a quadratic stress function can be formulated which heavily penalizes a high capacity usage on individual edges of communication paths.

In this way, an optimized routing is determined by selecting for each traffic demand of the set of traffic demands one short communication path from the set of potential short communication paths such that the quadratic stress function is minimized. The minimum of the quadratic stress function preferably is a global minimum, but can also be a local minimum.

The method, hence, has the technical effect and advantage of a uniformly minimal utilization of the network and distribution of the distance to the capacity limits within the network to achieve a uniformly minimal utilization of the network with respect to capacity limits. At the same time, the method provides for a selection of short paths between a respective origin node and a respective destination node for each traffic demand within the communications network.

The underlying quadratic optimization problem, as mentioned above, is very complex. This is not only due to a potential impact of one selected communication path to other communication paths and a vast amount of data traffic to be managed between a plurality of origin nodes and destination nodes in the network. The problem is also very complex because there are many practical constraints that have to be taken into account. As more constraints are implemented, such problems become more complex and difficult to solve. This is problematic or difficult, if traffic engineering solutions are needed fast, for example, as a reaction to an unexpected network failure or under consideration of further practical constraints like latency (shortest possible paths, fewest possible IP hops), redundancy (the model should be redundant against failure of one or more/many edges, planned outages or maintenance of network links), Domains (EU, US) or hierarchies (core network, access networks) or the like. Our methods advantageously show their strength compared to conventional approaches more and more, the more complex the underlying problem is. In other words, for a complex optimization problem taking into consideration practical constraints as explained above, our method has a significant strength over conventional techniques.

Our methods make use of an approach inspired by quantum computing. The calculation of optimized solutions of the quadratic stress function to determine optimized communication paths for the set of traffic demands is performed by a so-called quantum concept processor. As a quantum concept processor in the context of the present disclosure a processor is defined that solves a so-called "Ising model" or the equivalent quadratic unconstrained binary problem. For example, this is a processor configured to solve an optimization problem by quantum annealing or quantum annealing emulation. Such a processor is, for example, based on conventional hardware technology, for example, based on complementary metal-oxide-semiconductor (CMOS) technology. An example of such quantum concept processor is a Fujitsu digital annealer. Alternatively, any other quantum processors can be used for the method, in future times also such technologies that are based on real quantum bit technologies. Further examples of such quantum concept processors are the DWave quantum annealer (e.g. 5000 Q), but also quantum gate computers (IBM, Rigetti, OpenSuperQ, IonQ or Honeywell) making use of quantum optimization algorithms like QAOA or VQE.

In other words, a quantum concept processor is a processor that realizes the concept of minimization of a so-called quadratic unconstrained binary optimization (QUBO) function, either on a special processor classic technology, a quantum gate computer or on a quantum annealer.

In at least one example, our method further comprises the following steps:

specifying a set of potential segment nodes among the plurality of communication nodes, wherein each of the potential segment nodes defines as intermediate node a potential short communication path as member of the set of potential short communication paths between an origin node and a destination node, formulating in the quadratic stress function, segment node terms that connect the calculated fractional capacity usages of the edges of a respective potential short communication path with those segment nodes within the set of potential segment nodes that lead to the respective potential short communication path, and calculating the segment node terms, by using the quantum concept processor to choose segment nodes within the set of potential segment nodes such that the quadratic stress function is minimized for the determination of the optimized routing.

In this way, for each traffic demand one or more segment nodes are determined individually such that a so-called segment routing (SR) protocol can be implemented. A set of potential segment nodes among the plurality of communication nodes is, hence, specified, wherein each of the potential segment nodes defines as intermediate node a potential short communication path as member of the set of potential short communication paths between an origin node and a destination node. Segment routing (SR) is a concept to define alternative communication paths between individual origin and destination nodes. For each pair of origin and destination nodes a sequence of one or more so called segment nodes is selected and the route between origin and destination is then given as the concatenation of shortest path between origin and first segment node, shortest paths between a segment node an its respective successor in the sequence of segment nodes and the shortest path between the last segment node and the destination node. A specialization of SR is the n-Segment-Routing (nSR), where up to n-1 segment nodes and hence n shortest path segments are possible as routes between origin and destination. This is a concept of so-called Source Packet Routing in Networking (SPRING). SR gives an additional degree of freedom since with one or more segment nodes lying in between a respective origin node and a respective destination node certain variations or adaptations in the routing of data traffic can be reverted to. This offers an elegant compromise between static shortest paths and a flexible and variable routing of data traffic.

In an example that a direct shortest path between a respective origin node and a respective destination node is not available, e.g. due to construction works or maintenance in the network, SR gives an additional degree of freedom. In this way, a selected detour can be chosen in the step of determination of the optimized routing in the above-explained method that, nevertheless, is still a short optimized path in the sense explained above. But also in view of an optimized distributed overall capacity usage in the network, SR gives an additional degree of freedom. In this way, different short paths for different traffic demands (e.g. via different segment nodes) can be selected to avoid overloads or critical increase of the capacity usage at respective edges of communication paths in the network.

The connection of calculated fractional capacity usages of the edges within potential communication paths with potential segment nodes (segment node terms) allows for the calculation of an optimized solution (minimum) of the quadratic stress function under consideration of an assignment of different segment nodes into communication paths for different traffic demands according to SR. In this way, an optimized selection of one or more respective segment nodes for each traffic demand can be achieved to fulfil the above-explained optimization problem. Hence, an impact of a selected communication path for one traffic demand to other possible communication paths for other traffic demands can be mitigated. By applying the freedom of the SR, different short communication paths for different traffic demands can be directed over different segment nodes within the network to distribute the overall capacity usage within the network. An optimized selection of respective segment nodes is performed by the quantum concept processor.

The set of potential segment nodes can be preselected under the consideration that for each traffic demand a subset of all possible segment nodes is chosen such that the corresponding communication paths are close to the shortest paths between respective origin nodes and respective destination nodes with respect to predetermined capacity usages of the concerned edges in the communication paths. The segment nodes can represent physical network elements such as routers, i.e. nodes, or interfaces, i.e. links.

The segment node terms may be calculated under consideration of a path condition that each traffic demand of the set of traffic demands is routed along a shortest path or via exactly one segment node between the respective origin node and the respective destination node. Such path condition forms a constraint or "boundary" for the method to realize a so-called two-segment routing (2SR) protocol. For practical networks it turns out that 2SR already provides sufficient flexibility and degrees of freedom compared to general SR, but nevertheless avoids a vast number of segment nodes to be implemented. This keeps implementation costs low. Additionally, 2SR allows for an optimized routing close to a shortest path routing of all traffic demands. For each traffic demand of the set of traffic demands, the quantum concept processor chooses either the shortest paths from the respective origin node to the respective destination node or a 2SR path across one selected segment node from the set of potential segment nodes to achieve a minimum of the quadratic stress function, as explained above.

Alternatively, the segment node terms are calculated under consideration of a path condition that each traffic demand of the set of traffic demands is routed along a shortest path or via multiple segment nodes between the respective origin node and the respective destination node. Such path condition forms a constraint or "boundary" for the method to realize a segment routing (SR) protocol instead of a two-segment routing (2SR) protocol.

The segment node terms may be calculated under consideration of a cost condition such that a number of chosen segment nodes is minimized. In this way, an additional optimization target is formulated and considered in the method that relates to a minimization of the overall number of assigned segment nodes to minimize deployment and maintaining costs. In a theoretical approach, the higher the number of assigned segment nodes, the more optimal the solution of the quadratic stress function found by the quantum concept processor. However, a high number of segment nodes means high deployment and maintenance costs of the segment nodes. With the additional optimization target of minimizing the overall number of assigned segment nodes, the minimization of the quadratic stress function can be achieved by the quantum concept processor, thereby achieving a reduction and minimization of the total costs for assigned segment nodes. Both optimization criteria can be balanced against each other, depending on which optimization should be focused on.

The quadratic stress function may be formulated as a quadratic unconstrained binary optimization (QUBO) function. This QUBO function serves as "input" for the quantum concept processor that solves this optimization problem for an optimized routing of all traffic demands according to the above-explained method. Generally speaking, QUBOs are quadratic order polynomials in binary variables which are represented in a quantum concept processor as bits or quantum bits (Q-bits hereinafter). In the context of the optimization problem of the present disclosure, the QUBO function represents the sum of potential contributions of the fractional capacity usages of respective edges within potential communication paths as function of different Q-bits, wherein each Q-bit represents the selection of a path alternative that can assume the value "0" or the value "1". To solve the quadratic optimization problem (quadratic stress function), the quantum concept processor runs through different settings of the different Q-bits to find such solution(s) that minimize the quadratic optimization problem. In this way, a QUBO representation of the optimization problem has elegant properties regarding the here applied quantum concept computing.

The quadratic stress function and at least one of the path condition(s) and the cost condition, as explained above, each may be weighted and combined into a global QUBO function. This has the advantage that the different partial optimization problems can be weighed against each other. For example, the quadratic stress function and the cost condition depending on the number of chosen segment nodes are weighed against each other, depending on the priority of cost reduction or uniform traffic distribution within the network.

The method may further comprise the following steps:
selecting a subset of traffic demands from the set of traffic demands,
performing the method for the subset of traffic demands,
storing the determined optimized routing for the subset of traffic demands, and
updating a respectively remaining usage capacity limit of the edges within the set of potential short communication paths under consideration of the determined optimized routing for the subset of traffic demands.

In this way, a kind of decomposition strategy can be followed. This has the advantage of or is even necessary for processing the explained method despite limited hardware performance of the quantum concept processor for solving the quadratic optimization problem. Assuming a high number of required variables to formulate the quadratic optimization problem, nowadays, the possibilities of current quantum concept processors are still limited. Hence, the very complex quadratic optimization problem has to be decomposed into several partial solutions that can be iteratively processed to find an optimal solution. In each iteration one partial solution is found by the quantum concept processor.

For example, under consideration of a QUBO formulation of the quadratic optimization problem formulated as SR-problem, as explained above, the number of required bit variables (Q-bits) to formulate the optimization problem is e.g.

$$|D| \times |S|$$

wherein $|D|$ is the number of traffic demands to be processed and $|S|$ is the number of segment nodes considered per demand. In typical data sets underlying the present disclosure, the number of traffic demands $|D|$ is typically a few thousands and the set $|S|$ of segment nodes may contain almost fifty segment nodes.

Taking further into account that a typical quantum concept processor nowadays can solve quadratic optimization problems in the order of 10.000 bit variables (Q-bits), the overall optimization problem has to be solved iteratively with the help of a problem decomposition.

Hence, the optimization problem can be iteratively decomposed by the above-explained measures, wherein a subset of traffic demands from the set of traffic demands is selected and our method performed for the subset of traffic demands. Subsequently, the determined optimized routing for the subset of traffic demands is stored and a respectively remaining usage capacity limit of the edges within the set of potential short communication paths is updated under consideration of the determined optimized routing for the subset of traffic demands.

According to an example, to decompose the problem, the traffic demands are sorted by volume in a descending order and split into discrete portions of demands. In particular, the demands with the largest volume can be regarded first, followed then by those demands with the smallest volume. Then, starting with the demands with the largest volume, the corresponding routing optimization problem is iteratively formulated and optimized for each discrete portion of demands with the help of the quantum concept processor. The partial solutions for each discrete portion of demands is stored and the edge capacities are reduced by the usage corresponding to the partial solution found in the previous iteration. Then the method proceeds with the next subset of demands. In this way, traffic demands with large volume, which require a higher fraction of edge capacities, can access a network little consumed in capacity, since they are considered in the early iterations of the algorithm, while demands with smaller volume are considered in the later iterations of the algorithm and are distributed on the remaining capacities of the network.

The method may further comprise the following steps:
selecting a subset of potential segment nodes from the set of potential segment nodes, and
performing the method for the subset of potential segment nodes.

Such implementation provides a further specialized decomposition strategy under consideration of the SR as explained above. To further save variables (Q-bits), the set |S| of potential segment nodes can be restricted to a subset of potential segment nodes from the set of potential segment nodes for each traffic demand. The calculated and chosen segment nodes for each traffic demand in the sense of an optimized solution (minimum of the quadratic optimization problem) are then stored before the next iteration of the method. For example, the subset of potential segment nodes for each traffic demand can be preselected as those segment nodes that have a close proximity to the shortest paths between respective origin and destination nodes of a respective traffic demand.

One or more of the above-explained decomposition procedures may be iteratively performed for the remaining traffic demands until all traffic demands of the set of traffic demands are processed.

The above-mentioned problem is also addressed by a quantum concept processor. The quantum concept processor is configured to perform one or more steps of a method as described above. According to an example, the quantum concept processor is a digital annealing processing unit. This unit can be specially configured to perform quantum annealing or a quantum annealing emulation as explained above. The quantum concept processor can be of any type explained above.

Moreover, the above-mentioned problem is also solved by a computer program comprising instructions that, when the program is executed by one or more processors, cause each of the one or more processors to perform one or more steps of a method as described above. At least one of these processors is e.g. a quantum concept processor as explained above. Other processors can be configured for processing, by executing the computer program, preparatory or iterative steps of or for a method as explained above.

Moreover, the above-mentioned problem is also solved by a workplace for a network planner, configured to verify an optimized routing determined by our method. Such a workplace, for example, has verification means that are configured for an (automated or semi-automated) verification of an optimized routing determined by our method. This serves a network planner to verify optimization results found by a method as described above. The verification means can be implemented in software and/or hardware. For example, the workplace can communicate or be connected to a system comprising a quantum concept processor that performs the method as described above. The results can then be taken over into the workplace.

Moreover, the above-mentioned problem is also solved by an interface arrangement comprising one or more interfaces to a plurality of communication nodes of a communications network in which data traffic is routed, wherein the interface arrangement is configured to automatically deploy an optimized routing determined by a method as described above to the communication nodes of the communications network. In this way, an optimized routing determined by a method as described above can be (automatically or semi-automatically) be deployed to a plurality of communication nodes of a respective communications network. For example, the interface arrangement can communicate or be connected to a workplace as describe above or to a system comprising a quantum concept processor that performs the method as described above. The results can then be taken over into the interface arrangement.

Moreover, as preparatory measure for one or more of the above-explained steps of the computer-implemented procedure, an interface can be implemented or used for reading out parameters from the communications network before a respective optimization and for inputting such parameters into the explained computer-implemented optimization procedure. The parameters, for example, comprises a network configuration, adjacency information for a graph description of the network, available capacities in the network and traffic demands to be expected.

Any aspects, features, effects and measures described alone or in combination with each other in the context of our methods explained above can be applied to or find analogous representation in aspects, features, effects and measures described alone or in combination with each other in the context of the quantum concept processor or the computer program explained above, and vice versa.

Our methods are further described below under consideration of several implementations with the aid of multiple drawings.

Figure 1:
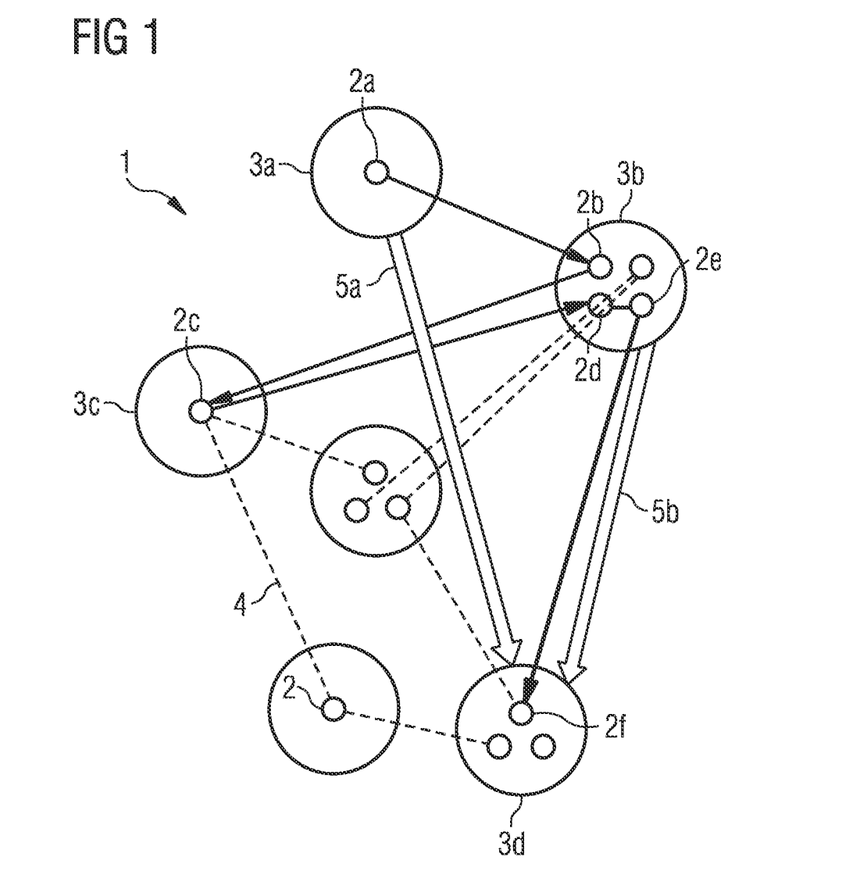
FIG. 1 shows an example of a communications network with exemplary routings of traffic demands following a conventional approach.

FIG. 1 shows an example of a configuration of a communications network 1 with exemplary routings of traffic demands 5a and 5b following a conventional approach. The communications network 1 comprises a plurality of communication nodes 2, wherein a connection 4 between two adjacent communication nodes 2 is called an edge. This is exemplarily illustrated between the communication node 2 and another communication node 2c, which can communicate with each other over the connection 4. Depending on the historically grown configuration and implementation of the communications network 1, several communication nodes 2 are aggregated into so-called aggregation nodes 3. As exemplarily illustrated in FIG. 1, the communication node 2a is aggregated within aggregation node 3a, whereas other communication nodes 2b, 2d and 2e are aggregated in the aggregation node 3b, for example.

The communication nodes 2 are, for example, so-called label edge routers (LER) that route incoming and outgoing data traffic within the network 1. The aggregation nodes 3 are called Meta nodes and are aggregation zones of LERs in a certain region of the network 1. For example, the aggregation nodes 3 are centralized aggregation zones of determined economic areas or cities between which a communication shall take place. In other applications, the aggregation nodes 3 can, for example, be entities of an industry network or of a traffic network or the like.

The communication network 1, in general, is part mashed. This means that not all of the communication nodes 2 are connected or connectable with all other communication nodes 2. Instead, there are only several connections 4 (see dotted connections) between several communication nodes 2 implemented in the network 1, which, for example, came from historical evolution of the network 1. The connections 4 between respective communication nodes 2 are, for example, implemented by fibre optic connections. However, other technologies like radio technologies (e.g. 5G) or copper/DSL technologies are applicable as well, in general.

As explained above, FIG. 1 illustrates a certain scenario of traffic demands 5a and 5b, according to which certain data volumes have to be transferred between respective communication nodes 2 within the network 1. As exemplarily illustrated, a first traffic demand 5a is between the communication node 2a within aggregation node 3a and another communication node 2f within aggregation node 3d. A second traffic demand 5b is between a communication node 2e within aggregation node 3b and again communication node 2f within aggregation node 3d. Each traffic demand 5a and 5b, hence, defines a determined volume to be transferred from an origin node to a destination node. In the exemplary scenario according to FIG. 1 the origin node for traffic demand 5a is the communication node 2a, whereas the destination node for the traffic demand 5a is the communication node 2f. Analogously, for traffic demand 5b the origin node is communication node 2e and the destination node is communication node 2f.

Alternatively, traffic demands can be defined as demands between aggregation nodes 3, irrespective on which internal communication node 2 within a respective aggregation node 3 the communication starts or ends. For example, the demands 5a, 5b can be defined as demands between the aggregation nodes 3a and 3d (demand 5a) and aggregation nodes 3b and 3d (demand 5b). In such an alternative, there is a "virtual" edge between the respective aggregation node and its internal communication nodes, wherein the virtual edge has a very high capacity. This leads to the effect that it does not play a significant role, on which internal communication node 2 within a respective aggregation node 3 the communication starts or ends.

Each traffic demand 5a and 5b burdens the network 1 with a usage of the network's capacity, i.e. the capacity of respective connections 4 of potential communication paths between the respective communication nodes 2 in the network 1. In the example of the scenario in FIG. 1, the traffic demand 5a is transferred from communication node 2a to communication node 2f via the communication nodes 2b, 2c, 2d, 2e, and 2f. In parallel, the traffic demand 5b is transferred simply over the connection 4 between the communication nodes 2e and 2f. In this scenario, two drawbacks occur. A first drawback lies in the communication path for the transfer of the traffic demand 5a being a long and complicated path through the network 1. This transfer embeds a plurality of communication nodes 2 and connections 4 in the network 1 for transferring the traffic demand 5a. A second drawback lies in the fact that both traffic demands 5a and 5b are finally transferred over the connection 4 between the communication nodes 2e and 2f. Hence, the link capacity of the connection 4 between the nodes 2e and 2f is loaded to a significant extent. This may lead to an overload of the connection 4 between nodes 2e and 2f, resulting in increased latency or loss of data or the like.

Figure 2A:
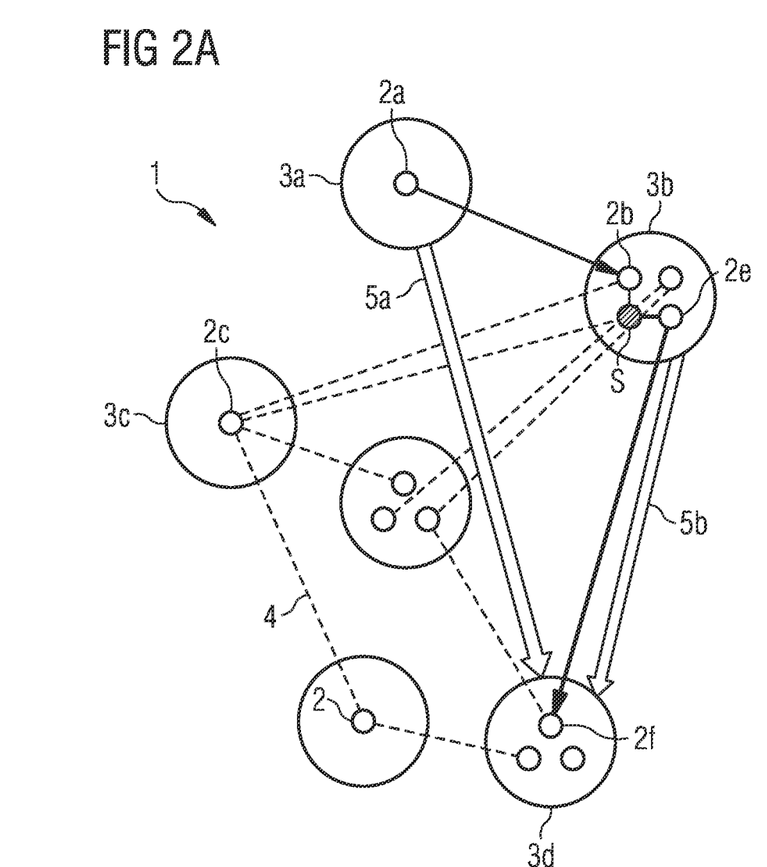
FIG. 2A shows an example of a configuration of a communications network with exemplary routings of traffic demands following an alternative approach.

FIG. 2A shows an example of a configuration of the communications network 1 with exemplary routings of traffic demands 5a and 5b (see above) following an alternative approach. In the scenario according to FIG. 2A, an intermediate node s (segment node s), is determined to route the traffic demand 5a. The segment node s is configured within the aggregation node 3b together with other communication nodes 2b and 2e. Compared to FIG. 1, for example, communication node 2d (see FIG. 1) has been declared as segment node s according to the scenario of FIG. 2A. This results in the traffic demand 5a being transferred on an alternative communication path starting again in communication node 2a and following the communication node 2b, the segment node s and the communication nodes 2e and 2f.

The scenario according to FIG. 2A has the advantage over the scenario of FIG. 1 that the communication path for the transfer of the traffic demand 5a has become closer to a short path or shortest path strategy, thereby keeping the number of involved communication nodes 2 and connections 4 in the network 1 low (at least lower than in the scenario of FIG. 1). However, also in the scenario of FIG. 2A the other drawback remains, according to which the connection 4 between the nodes 2e and 2f is still heavily loaded with both traffic demands 5a and 5b going over this connection of the network 1.

Figure 2B:
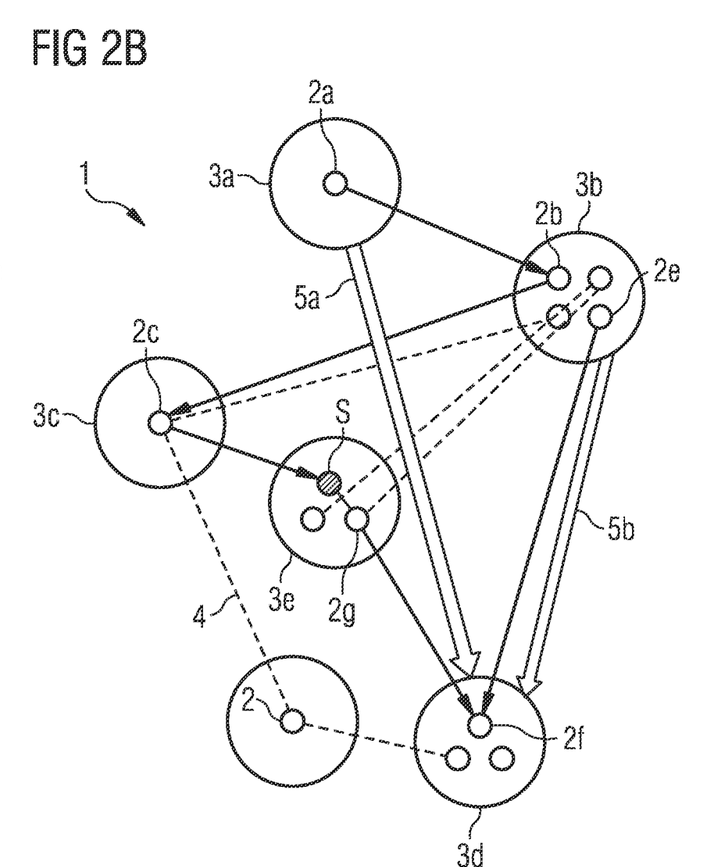
FIG. 2B shows an example of a configuration of a communications network with exemplary routings of traffic demands following our approach.

FIG. 2B shows an example of a configuration of the communications network 1 according to FIGS. 1 and 2A, but now with exemplary routings of the traffic demands 5a and 5b following our approach. In the scenario of FIG. 2B, an optimized segment node s is chosen, which now lies within the aggregation node 3e instead of the aggregation node 3b according to FIG. 2A. This results in the traffic demand 5a being transferred within a communication path starting in node 2a, the communication nodes 2b, 2c, segment node s, and communication nodes 2g and 2f. The other traffic demand 5b is, as in the scenarios according to FIGS. 1 and 2A, transferred between the two communication nodes 2e and 2f.

The scenario according to FIG. 2B, hence, transfers the traffic demand 5a on a still relatively short path between the origin node 2a and the destination node 2f. The real value of the approach according to FIG. 2B, however, lies in the fact that the traffic demand 5a, on its final route segment towards its destination 2f is not transferred over the connection 4 between the nodes 2e and 2f, but over the connection 4 between the nodes 2g and 2f. This results in the connection 4 between the nodes 2e and 2f only being loaded with the traffic of traffic demand 5b.

Hence, the approach of FIG. 2B addresses the drawbacks of the approaches according to FIGS. 1 and 2A, thereby achieving a short path communication in the network 1 together with a uniform and optimized distribution of the overall capacity usage of the connections 4 in the network 1 for all traffic demands 5 that have to be transferred in the network 1.

In the following, the implementation of the approach according to FIG. 2B is further explained in detail.

The optimization problem to be addressed lies in determining an optimized routing through the network 1 by selecting for each traffic demand 5 one short communication path from a set of potential short communication paths such that a mathematically formulated quadratic stress function (core optimization problem) is minimized. This serves the purpose and has the technical effect of choosing for all traffic demands 5 in the network 1 respective communication paths that are as close as possible to a shortest path strategy combined with the effect that the overall capacity usage of connections 4 within the selected communication paths can be uniformly minimized in the network 1. This avoids some of the connections 4 lying in respective communication paths to be highly burdened or overloaded, whereas a minor load of other connections 4 could lead to significantly lower such stress.

To achieve the above advantageous effect, a computer-implemented algorithmic method of optimizing the routing within the communication network 1 is implemented. This is explained in the following.

Figure 3:
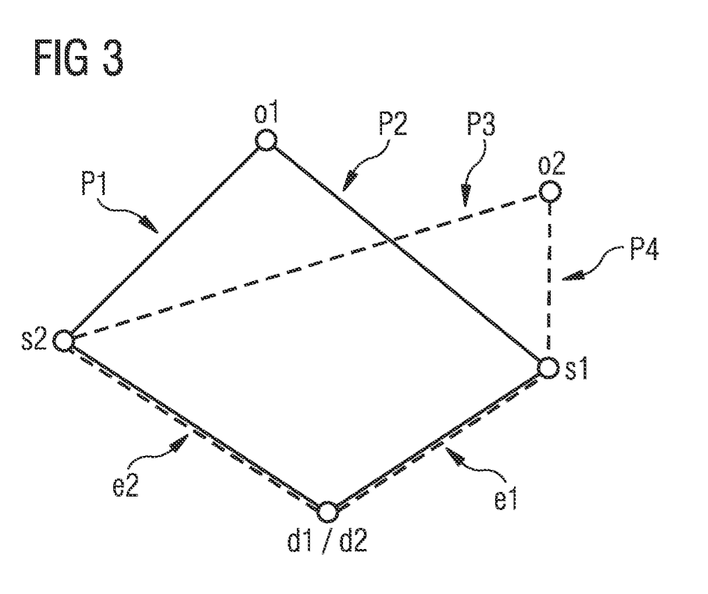
FIG. 3 shows a schematic illustration of an example of potential communication paths for a routing of traffic demands between origin and destination nodes.

FIG. 3 shows a schematic illustration of potential communication paths p1 to p4 for a routing of traffic demands between origin nodes o1, o2 and destination nodes d1, d2. In the exemplary approach of FIG. 3, two separate origin nodes o1 and o2 are implemented, whereas one destination node serves either as destination node d1 or as destination node d2. In this way, two traffic demands are defined, one traffic demand between the origin o1 and the destination d1 and the other traffic demand between the other origin o2 and the same destination d2. Determined data volumes are to be transferred between o1, d1 and o2, d2. The core optimization problem now lies in choosing and determining optimal communication paths for the traffic demands o1, d1 and o2, d2 such that short communication paths as close as possible to a shortest path approach are chosen and at the same time an overall capacity usage of connections within potential communication paths are minimized such that the overall usage of the capacities in the network is uniformly minimized within the network.

According to FIG. 3, the set of potential short communication paths p1 to p4 is specified in advance. This can, for example, be done through application of a Dijkstra algorithm that calculates potential short communication paths between pairs of origin nodes and destination nodes o1, o2, d1, d2 for each traffic demand to be transferred. As exemplarily illustrated in FIG. 3, path p1 goes from o1 over a segment node s2 to d1. Path p2 goes from o1 over the segment node s1 to d1. Path p3 goes from o2 over segment node s2 to d2. Path p4 goes from o2 over segment node s1 to d2. These are possible communication paths for a routing of data traffic between respective origins o1 and o2 towards the destination d1/d2.

The segment nodes s1 and s2 serve as intermediary nodes in the respective communication paths. Notwithstanding the core optimization problem of calculating optimized short communication paths for respective traffic demands, a special aspect in this optimization problem lies in choosing segment nodes s for the transmittal of traffic demands such that the core optimization problem is still fulfilled. The main advantage of configuration of segment nodes s1, s2 lies in a gained degree of freedom and flexibility for the routing of the traffic demands. FIG. 3 exemplarily implements a two-segment routing (2SR) protocol, as explained above.

FIG. 3 further illustrates two exemplary connections that are further reference to as edges e1 and e2 and that may lie in potential communication paths. The edge e1 is configured between the segment node s1 and the destination d1/d2, whereas the edge e2 is configured between the segment node s2 and the destination d1/d2.

Assuming different options for a routing of traffic demands between the origins o1, o2 and the destination d1/d2, an option for the routing from o1 to d1 is path p1 such that the data traffic o1, d1 is transferred over edge e2. Another option for routing from o1 to d1 is path p2 such that data traffic o1, d1 is transferred over edge e1. Analogous assumptions can be applied for the data traffic o2, d2. Here, a first option is path p3 such that the data traffic o2, d2 is routed over edge e2. A second option for the routing from o2 to d2 is path p4 such that the data traffic o2, d2 is routed via edge e1. As can be seen from these different options for a routing of the data traffic o1, d1 and o2, d2, there are combinations of communication paths for o1, d1 and o2, d2, wherein the two edges e1 and e2 each are burdened with one traffic demand only. This is, for example, given with o1, d1 going path p1 and o2, d2 going path p4. However, there are also possible combinations of communication paths wherein one of the edges e1 and e2 is significantly and heavily loaded with both traffic demands, whereas the other of the two edges e1 and e2 is not used at all. This is, for example, given with o1, d1 going path p1 and o2, d2 going path p3 (or o1, d1 going path p2 and o2, d1 going path p4).

The latter combinations have the significant drawback that the capacity usage of one of the edges e1 and e2 is significantly higher, which may result in an overload or failure of the respective edge. Hence, the optimization problem lies in determining and selecting communication paths for the traffic demands o1, d1 and o2, d2 such that the overall capacity usage is distributed over both edges e1 and e2. In a specialized implementation of such optimization problem, a respective assignment of the segment nodes s1 and s2 is performed for an optimized selection of respective communication paths for the transfers of o1, d1 and o2, d2.

To address such an optimization problem, fractional capacity usages of all edges within the set of the potential short communication paths can be calculated for the whole set of traffic demands. As exemplarily given in FIG. 3, such measure includes the calculation of fractional capacity usages of each of the edges e1 and e2 for each of the traffic demands o1, d1 and o2, d2. "Fractional capacity usages" of the respective edges means that based on the respective usage capacity limit of each edge, the fraction of the capacity usage is calculated that is required for each traffic demand to be transmitted over this edge.

For example, with regard to FIG. 3, assuming that each traffic demand o1, d1 and o2, d2 requires half of the maximum usage capacity of each edge e1 and e2 (i.e. 50% of the capacity), this means that each edge e1 and e2 is burdened with half of its usage capacity for each traffic demand o1, d1 and o2, d2. In other words, if o1, d1 goes over path p1 and o2, d2 goes over path p4, for example, the edges e1 and e2 both are burdened with 50% of their usage capacity limit. Otherwise, if o1, d1 goes over path p1 and o2, d2 goes over path p3, for example, then edge e2 is fully and completely burdened (2×50%=100%), thereby reaching its capacity limit, resulting in a utilization of the entire edge capacity of e2. Analogous assumptions can be applied when o1, d1 goes over p2 and o2, d2 goes over p4 with regard to the edge e1.

Such calculations of fractional capacity usages are performed for all remaining edges lying within potential communication paths p1 to p4 in the approach of FIG. 3. The calculated fractional capacity usages are then formulated as terms of a quadratic stress function which is further explained in detail below and in view of FIG. 4C.

FIGS. 4A to 4D show exemplary mathematical formulations of partial optimization problems following the approach as explained above with regard to the FIGS. 2B and 3. The mathematical formulations of FIGS. 4A to 4D are represented as so-called Hamiltonian functions, short Hamiltonians.

Figures 4A, 4B:
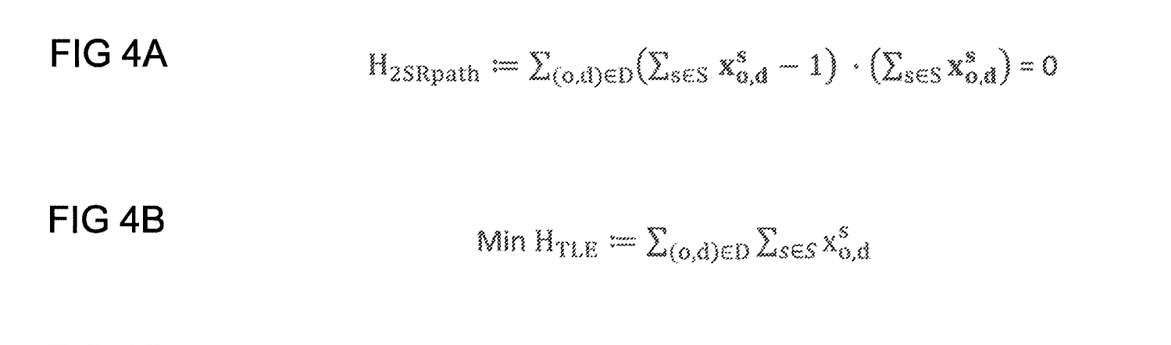
FIGS. 4A to 4D show an example of mathematical formulations of partial optimization problems following our approach.

The mathematical formulation of FIG. 4A formulates a path condition according to which each traffic demand between respective origins and destinations (o, d) is to be routed along a shortest path or via exactly one segment node (s) between the respective origin node o and the respective destination node d. With respect to the exemplary scenario of FIG. 3 this means that the traffic o1, d1 and the traffic o2, d2 can be either routed along a shortest path (not explicitly shown in FIG. 3) or via exactly one segment node s1, s2. This means for each of the traffic demands o1, d1 and o2, d2 that only one segment node s1 or s2 can be chosen for each demand.

The mathematical formulation in FIG. 4A is formulated as summed terms of binary variables $x_{o,d}^s$ that can assume the value "0" or the value "1" (or both with a certain probability) and are represented in a quantum concept processor as bits (or Q-bits as used hereinafter). For each segment node s and under consideration of each traffic demand o, d from an origin o to a destination d, a respective Q-bit $x_{o,d}^s$ can be set. The respective Q-bit $x_{o,d}^s$ is set to the value "1" if a respective segment node s is included in a respective communication path, and set to the value "0", if not. Considering the formulation of the Hamiltonian of FIG. 4A, the Hamiltonian must be equal to "0". This is only fulfilled if for each traffic demand o, d only one single segment node s is chosen such that only one Q-bit $x_{o,d}^s$ a assumes the value "1" and all other Q-bits $x_{o,d}^s$ for other segment nodes s have the value "0". Otherwise, if more than one segment nodes s would be chosen, the condition in FIG. 4A would not be fulfilled. The path condition, mathematically formulated as Hamiltonian in FIG. 4A has the effect that only communication paths over one single segment node s can be chosen to calculate only communication paths that are close to a shortest path strategy.

The mathematical formulation in FIG. 4B formulates a cost condition regarding a number of overall used segment nodes in the network 1. This Hamiltonian sums all Q-bits $x_{o,d}^s$ with the value "1" (indicating segment nodes selected for a routing) over all traffic demands o, d. A partial optimization problem now lies in minimizing the number of selected segment nodes by minimizing the Hamiltonian of FIG. 4B. This cost condition serves the purpose of minimizing as best as possible in the sense of a global optimization the number of used segment nodes to keep deployment and maintaining costs as low as possible (minimize these costs).

Figure 4C:
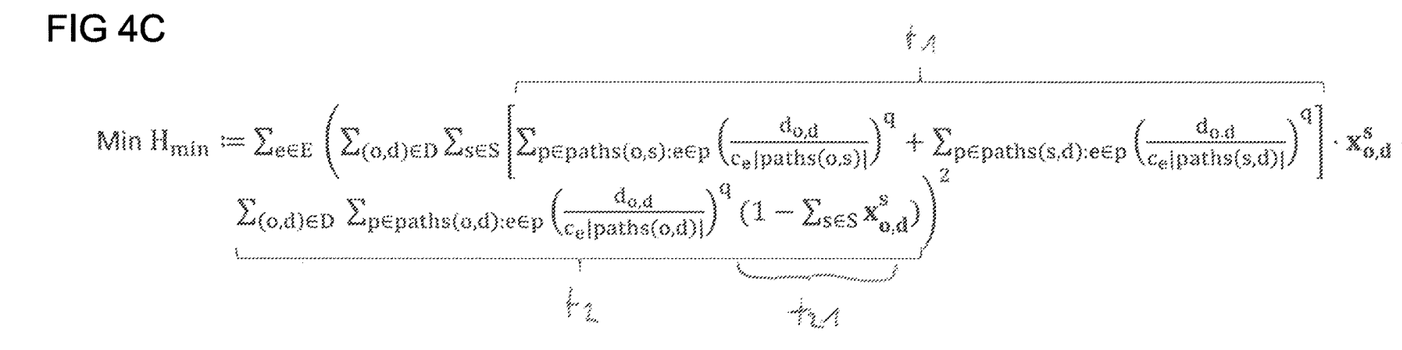

The mathematical formulation of the Hamiltonian according to FIG. 4C represents a core optimization problem that is formulated as a quadratic stress function taking into account the calculated fractional capacity usages of all edges e within the set of potential short communication paths p for all traffic demands o, d. Hence, the core optimization problem here lies in minimizing the Hamiltonian according to FIG. 4C to find optimized communication paths for all traffic demands within the network.

The Hamiltonian of FIG. 4C considers summed terms for each edge e within a potential communication path p considering all traffic demands o, d and further considering a set of segment nodes s that can be chosen for selecting communication paths p. Assuming that the expression in FIG. 4A is satisfied, the Hamiltonian of FIG. 4C describes the sums of all calculated fractional capacity usages $d_{o,d}/c_e$ of all edges e that are part of potential communication paths p. d_(o,d) here represents the volume of the traffic demand and $c_e$ represents the capacity of the respective edge e. The fractional capacity usages $d_{o,d}/c_e$ are connected with the respective Q-bits $x_{o,d}^s$ into segment node terms. As explained above, the Q-bits $x_{o,d}^s$ can assume either the value "0" or the value "1" depending on whether a segment node s associated with a respective Q-bit $x_{o,d}^s$ is taken into account or not.

The Hamiltonian of FIG. 4C has two main terms t1 and t2. t1 formulates a routing according to the 2SR-approach, wherein the first expression of t1 sums all fractional capacity usages $d_{o,d}/c_e$ of all demands o, d in the segment between an origin o and a segment node s. The second expression of t1 then sums all fractional capacity usages $d_{o,d}/c_e$ of all demands o, d in the segment between a respective segment node s and a destination d. The second term t2, considers shortest paths for all demands o, d by summing the fractional capacity usages $d_{o,d}/c_e$ of all edges e lying in these shortest paths. The shortest paths are defined such that none of the possible segment nodes s is chosen.

The Hamiltonian of FIG. 4C is formulated such that either the term t1 or the term t2 is considered (but not both). Hence, either a path with one segment node s can be chosen or a shortest path with no segment node s. This is due to the setting of the respective Q-bits $x_{o,d}^s$. In the example that at least one segment node s is chosen, at least one Q-bit $x_{o,d}^s$ a has the value "1". In this example, the term t1 multiplied with the Q-bits $x_{o,d}^s$ (one of them having the value "1") is considered. In this example, however, the second term t2 becomes "0", since the term t21 of t2 becomes "0". In contrast, in the example that none of the segment nodes s is chosen, all Q-bits $x_{o,d}^s$ have the value "0" resulting in that the term t1 is multiplied by "0" and is not considered. In this example, however, the second term t2 is considered, since its internal expression t21 becomes "1".

The exponentiation parameter "q" with values greater than 0 and less than or equal to 1 can be used as an additional problem-specific control parameter. For q<1, demands with smaller volumes are preferentially assigned to segment nodes that result in a collection of shortest paths with small edge capacities. In contrast, for q=1, all demands are evenly distributed without further preference.

In this way, the Hamiltonian of FIG. 4C is formulated so as to consider either shortest paths or exclusively one segment node s for selecting a communication path p for each demand o, d, thereby considering all fractional capacity usages $d_{o,d}/c_e$ of all edges e lying in respective parts of the potential communication paths p.

Considering the scenario of FIG. 3 for the two edges e1 and 2 exemplary, the Hamiltonian according to FIG. 4C may have the following expression with q=1:

$$\text{Min}H_{min} = \text{Min}\left(\frac{d_{o1,d1}}{c_{e1}} \cdot x_{o1,d1}^{s1} + \frac{d_{o2,d2}}{c_{e1}} \cdot x_{o2,d2}^{s1}\right)^2 + \left(\frac{d_{o1,d1}}{c_{e2}} \cdot x_{o1,d1}^{s2} + \frac{d_{o2,d2}}{c_{e2}} \cdot x_{o2,d2}^{s2}\right)^2$$

Under the assumption that each demand o1, d1 and o2, d2 burdens a respective edge e1, e2 with half of its capacity (50%), as explained above, the above term reaches a minimum, if o1, d1 and o2, d2 are routed over different segment nodes s. Then, the above term is:

$$\text{Min}H_{min} = \left(\frac{1}{2}\right)^2 + \left(\frac{1}{2}\right)^2 = \frac{1}{2}. \quad (12)$$

Otherwise, if o1, d1 and o2, d2 are routed over one common segment node s1 or s2 (and the other segment node is not used), the above term is:

$$\text{Min}H_{min} = \left(\frac{1}{2} + \frac{1}{2}\right)^2 = 1.$$

Hence, the costs/stress for the network is higher in the latter solution, which is worse over the above solution.

The above example shows that a choice of different segment nodes s for the two demands o1, s1 and o2, d2 is the preferred solution for achieving the optimization target of a short path routing together with distributing the overall capacity usage over the network.

The Hamiltonian of FIG. 4C is generally solved for all traffic demands in a network by a quantum concept processor that runs through different settings of values for the respective Q-bits $x_{o,d}^s$, thereby calculating the respective result of the Hamiltonian. The target of doing so is to find the minimum of the Hamiltonian for respective set values of Q-$x_{o,d}^s$. As soon as a respective minimum of the Hamiltonian of FIG. 4C is found, the respective values of the Q-bits $x_{o,d}^s$ leading to this minimum are stored and finally define respective communication paths of respective traffic demands. This is due to the fact that each Q-bit $x_{o,d}^s$ defines either a shortest path or a routing according to the 2SR-approach via exactly one segment node s for each demand o, d, as explained above. Hence, by calculating a minimum of the Hamiltonian of FIG. 4C by using a quantum concept processor, an optimized routing is calculated by selecting for each traffic demand o, d one short communication path p from the set of potential short communication paths.

Figure 4D:
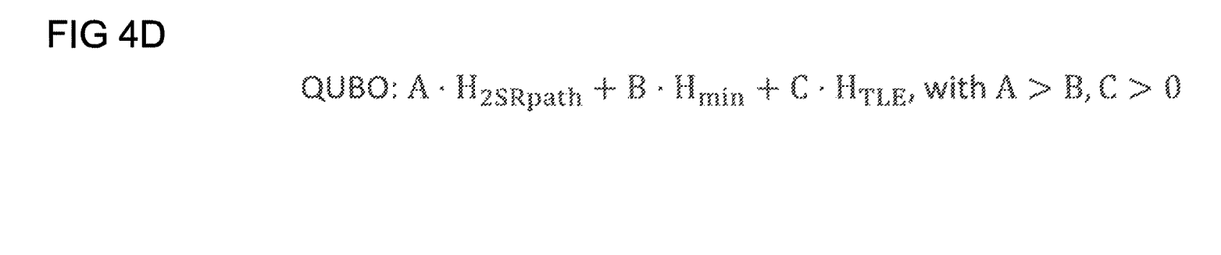

FIG. 4D finally shows a global QUBO formulation of the overall optimization problem in which the three partial optimization problems according to FIGS. 4A to 4C are multiplied with a respective weighting factor A, B, C and summed to the global optimization problem. This global optimization problem is finally processed by applying a computer-implemented algorithm within the quantum concept processor. In this regard, a minimization of the Hamiltonian according to FIG. 4C takes place, thereby considering further optimization constraints as formulated in the Hamiltonians according to FIGS. 4A and 4B.

In particular, regarding the Hamiltonian of FIG. 4B, a compromise is calculated between a minimum of the Hamiltonian of FIG. 4C and a minimum of the costs depending on the number of used segment nodes s as formulated in the Hamiltonian of FIG. 4B. A global minimum of the Hamiltonian of FIG. 4C could be found by significantly increasing the number of selected and used segment nodes s. This, however, would significantly increase the deployment and maintaining costs of segment nodes s as expressed in the Hamiltonian of FIG. 4B. In contrast, strictly minimizing the costs for deployment and maintaining of segment nodes s (in fact choosing no segment node at all) would, however, lead to the fact that the Hamiltonian of FIG. 4C cannot be satisfactorily solved to reach a sufficient minimum.

The global optimization problem formulated in FIG. 4D respects a determined compromise between these partial optimization problems by seeking to find a minimum of the quadratic stress function for the capacity usage (FIG. 4C) under consideration of a minimization of the overall number of used segment nodes for the routing (FIG. 4B) and further under consideration of the constraint that only one or none segment node can be chosen for each traffic demand (FIG. 4A).

With the aid of the weighting factors A, B and C according to FIG. 4D different weights and focus on different partial optimization problems can be set. If, for example, the factor B is greater than the factor C, the focus is more on minimization of the maximal capacity usage and a uniform distribution of the capacity usage. Otherwise, if the factor B is smaller than the factor C, the focus is more on a minimization of the overall costs of the used segment nodes. Additionally, the factor A can, for example, be set so high, that this constraint is practically never violated during the optimization. Alternative to a mathematical formulation A>B, C>0, for example, another mathematical formulation is A>B>0, C>=0.

Figure 5:
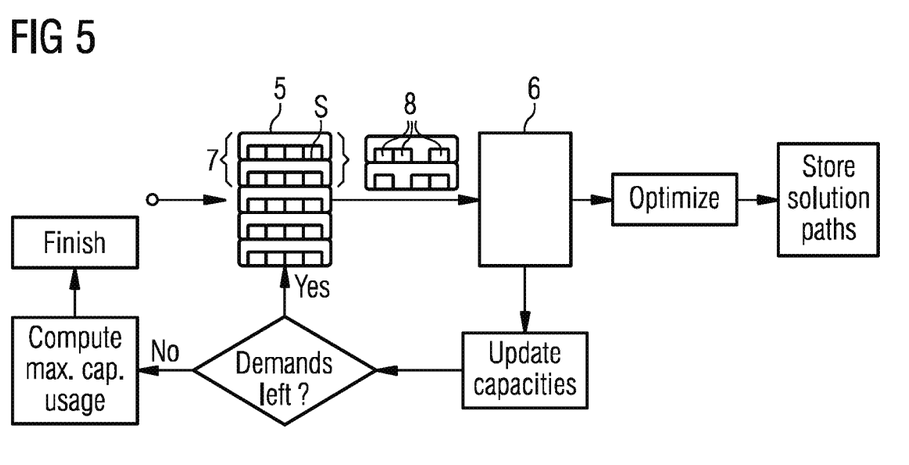
FIG. 5 shows a schematic illustration of an example of an algorithm performing our approach.

FIG. 5 shows an exemplary schematic illustration of an algorithm performing the approach as explained above. FIG. 5 shows the processing of the above explained method steps and procedure considering the set of traffic demands 5, wherein these traffic demands 5 are processed in a decomposed manner. This has the advantage of or is even necessary to process the explained method despite limited hardware performance of the quantum concept processor 6 for solving the optimization problem as explained above with regard to FIGS. 4A to 4D. This optimization problem is very complex and has to be decomposed into several partial solutions that can be iteratively processed to find an optimal solution. In each iteration one partial solution is found by the quantum concept processor 6.

Accordingly, to decompose the optimization problem, the traffic demands 5 are sorted by volume in a descending order and split into discrete portions of demands. In particular, the traffic demands 5 with higher volume can be regarded first, followed then by those traffic demands 5 with smaller volume. For this purpose, first a subset 7 of the traffic demands 5 is regarded in the algorithmic implementation according to FIG. 5. The subset 7 of traffic demands 5, for example, includes a certain percentage of the overall volume within the whole set of traffic demands 5. For example the subset 7 includes 30% of the traffic volume to be transmitted through the network. For this subset 7 of traffic demands 5, in a next step, a subset 8 of potential segment nodes s from the set of potential segment nodes s is selected. In this way, the overall number of potential segment nodes s is reduced to a subset 8 of potential segment nodes s that is most relevant with regard to the selected subset 7 of traffic demands 5. For example, the subset 8 of potential segment nodes s for each traffic demand 5 can be preselected as those segment nodes s that have a close proximity to the shortest paths between respective origin and destination nodes of respective traffic demand 5 being part of the subset 7.

The pre-processed subset 7 of traffic demands 5 with the selected subset 8 of segment nodes s is then input to an algorithmic procedure within the quantum concept processor 6. For example, the quantum concept processor 6 according to FIG. 5 is configured to address the optimization problem by quantum annealing emulation. The quantum concept processor 6 applies the mathematical formulation of the overall optimization problem according to FIG. 4D. The quantum concept processor 6 then calculates for the subset 7 of traffic demands 5 with the selected subset 8 of segment nodes s an optimized solution of the global optimization problem according to FIG. 4D.

After the algorithmic procedure is completed, the finally calculated minimum of the global optimization problem according to FIG. 4D is then output from the quantum concept processor 6 for the respective subset 7 of the traffic demands 5. The determined communication paths p according to the found optimum of the optimization problem are then stored for the subset 7 of the traffic demands 5.

Moreover, a respectively remaining usage capacity limit of the edges within the set of potential short communication paths p is updated under consideration that the determined optimized routing for the subset 7 of traffic demands 5 already requires a certain amount of the capacity in the network. If there are any demands left, the procedure is iteratively performed for the remaining traffic demands 5 until all traffic demands 5 of the set of traffic demands are processed. In this example, the maximum capacity usage for all traffic demands 5 to be transferred over determined communication paths through the network is computed. The algorithm is then finished.

Hence, by applying a computer-implemented algorithmic procedure according to FIG. 5, which bases on the implementations and explanations above with regard to FIGS. 2B to 4D, an optimized routing can be provided for all traffic demands over individually selected short communication paths through a communication network 1.

Formulation of the optimization problem as QUBO representation has elegant properties regarding the here applied quantum concept computing within processor 6. Nowadays, quantum concept computing still reaches significant limits. However, with computer science more and more developing towards quantum computing, our approaches can be further enhanced and developed in the future. For example, when quantum computing is more and more applicable for increasing complexities of underlying optimization problems, the decomposition strategy as explained in view of FIG. 5 can be more and more reduced, which means the optimization problem can be more and more processed and computed as a whole without decomposition steps and iterations of the problem. Moreover, with quantum computing be more and more applicable, a more and more increasing number of Qbits, more and more complex optimization problems and/or more and more non-linear constraints can be taken into consideration by the approach explained herein.

Our approaches are primarily applicable to communication networks. However, the approaches can also be applied to any other networks, like railway networks, energy grids, traffic networks and the like in which certain "traffic" or "load" has to be transmitted throughout the network over optimized paths.

The examples illustrated and explained herein are merely exemplary.

The invention claimed is:

1. A computer-implemented method of optimizing a routing of data traffic in a communications network with a plurality of communication nodes connectable over edges of communication paths for a routing of the data traffic, wherein the method comprises:
   capturing a set of traffic demands, each traffic demand specifying a transfer of a determined data volume from an origin node to a destination node among the plurality of communication nodes,
   specifying a set of potential short communication paths among possible communication paths between the respective origin nodes and the respective destination nodes specified in the set of traffic demands, wherein edges within the set of potential short communication paths are assigned a respective usage capacity limit,
   specifying a set of potential segment nodes among the plurality of communication nodes, wherein each of the potential segment nodes defines as intermediate node a potential short communication path as member of the set of potential short communication paths between an origin node and a destination node;
   calculating for the set of traffic demands, fractional capacity usages of the edges within the set of potential short communication paths, the fractional capacity usages being calculated based on the respective usage capacity limit,
   formulating the calculated fractional capacity usages as terms of a quadratic stress function,
   formulating in the quadratic stress function, segment node terms that connect the calculated fractional capacity usages of the edges of a respective potential short communication path with those segment nodes within the set of potential segment nodes that lead to the respective potential short communication path, and
   determining by using a quantum concept processor, an optimized routing by selecting for each traffic demand of the set of traffic demands one short communication path from the set of potential short communication paths, such that the quadratic stress function is minimized, and
   calculating the segment node terms, by using the quantum concept processor, to choose segment nodes within the set of potential segment nodes such that the quadratic stress function is minimized for the determination of the optimized routing.

2. The method according to claim 1, wherein the segment node terms are calculated under consideration of a path condition that each traffic demand of the set of traffic demands is routed along a shortest path or via exactly one segment node between the respective origin node and the respective destination node.

3. The method according to claim 2, wherein the quadratic stress function and at least one of the path condition and the cost condition each are weighted and combined into a global QUBO function.

4. The method according to claim 1, wherein the segment node terms are calculated under consideration of a path condition that each traffic demand of the set of traffic demands is routed along a shortest path or via multiple segment nodes between the respective origin node and the respective destination node.

5. The method according to claim 4, wherein the quadratic stress function and at least one of the path condition and the cost condition each are weighted and combined into a global QUBO function.

6. The method according to claim 1, wherein the segment node terms are calculated under consideration of a cost condition such that a number of chosen segment nodes is minimized.

7. The method according to claim 6, wherein the quadratic stress function and at least one of the path condition and the cost condition each are weighted and combined into a global QUBO function.

8. The method according to claim 1, further comprising:
   selecting a subset of potential segment nodes from the set of potential segment nodes, and
   performing the method for the subset of potential segment nodes.

9. The method according to claim 1, wherein the quadratic stress function is formulated as a quadratic unconstrained binary optimization function.

10. The method according to claim 9, wherein the quadratic stress function and at least one of the path condition and the cost condition each are weighted and combined into a global QUBO function.

11. The method according to claim 1, further comprising:
   selecting a subset of traffic demands from the set of traffic demands,
   performing the method for the subset of traffic demands,
   storing the determined optimized routing for the subset of traffic demands, and
   updating a respectively remaining usage capacity limit of the edges within the set of potential short communication paths under consideration of the determined optimized routing for the subset of traffic demands.

12. The method according to claim 11, wherein the method is iteratively performed for the remaining traffic demands until all traffic demands of the set of traffic demands are processed.

13. A quantum concept processor configured to perform the method according to claim 1.

14. The quantum concept processor according to claim 13, wherein the quantum concept processor is a digital annealing processing unit.

15. The quantum concept processor according to claim 13, wherein the quantum concept processor is a quantum annealing processing unit.

16. A computer program, the computer program comprising instructions that, when the program is executed by one or more processors, cause each of the one or more processors to perform the method according to claim 1.

17. A non-transitory computer-readable storage medium on which the computer program of claim 16 is stored.

18. An interface arrangement comprising one or more interfaces to a plurality of communication nodes of a communications network in which data traffic is routed, wherein the interface arrangement is configured to automatically deploy an optimized routing determined by the method according to claim 1 to the communication nodes of the communications network.

* * * * *